United States Patent
Miwa et al.

(10) Patent No.: US 6,673,162 B1
(45) Date of Patent: Jan. 6, 2004

(54) GLASS ARTICLE HAVING SURFACE COATING OF HYDROXY ACID AND METHOD OF MANUFACTURING THE SAME

(75) Inventors: Yoshiharu Miwa, Oumihachiman (JP); Yoshinobu Saji, Shiga (JP); Shigeyoshi Itou, Nagahama (JP)

(73) Assignee: Nippon Electric Glass Co., Ltd., Otsu (JP)

( * ) Notice: Subject to any disclaimer, the term of this patent is extended or adjusted under 35 U.S.C. 154(b) by 248 days.

(21) Appl. No.: 09/685,161

(22) Filed: Oct. 6, 2000

(30) Foreign Application Priority Data

| Oct. 8, 1999 | (JP) | ............................................ 11-288714 |
| Nov. 15, 1999 | (JP) | ............................................ 11-324583 |
| Nov. 16, 1999 | (JP) | ............................................ 11-324802 |
| Sep. 6, 2000 | (JP) | ......................................... 2000/270379 |
| Sep. 6, 2000 | (JP) | ......................................... 2000/270394 |
| Sep. 6, 2000 | (JP) | ......................................... 2000/270395 |

(51) Int. Cl.$^7$ ................................................. B08B 3/00
(52) U.S. Cl. .............................. 134/28; 134/2; 134/3; 134/4; 134/6; 134/26; 134/41; 428/34.4; 428/36.91; 428/35.7; 428/432; 524/457; 524/524
(58) Field of Search ................................ 428/34.4, 428, 428/36.91, 35.7, 432; 134/2, 3, 4, 6, 7, 18, 26–28, 41; 524/457, 524

(56) References Cited

U.S. PATENT DOCUMENTS

| 4,487,807 A | * | 12/1984 | Duffer et al. ................ 427/154 |
| 5,010,131 A | * | 4/1991 | Wagner ....................... 524/457 |
| 5,509,969 A | * | 4/1996 | Grawe ............................ 134/2 |
| 5,641,576 A | * | 6/1997 | Franz .......................... 206/451 |
| 5,695,876 A | * | 12/1997 | Franz et al. ................. 427/384 |
| 6,287,651 B1 | * | 9/2001 | Sasaki et al. ............... 313/466 |

FOREIGN PATENT DOCUMENTS

| FR | 2007203 | * | 1/1970 | ............ H01J/29/00 |
| JP | 02013955 A | * | 1/1990 | ............ G03F/7/11 |
| JP | 6-340865 | | 12/1994 | |
| JP | 408291274 A | * | 11/1996 | ............ C09J/7/02 |

* cited by examiner

*Primary Examiner*—Randy Gulakowski
*Assistant Examiner*—Gentle E. Winter
(74) *Attorney, Agent, or Firm*—Collard & Roe, P.C.

(57) ABSTRACT

A glass article comprising a glass body having a surface and a water-soluble surface-protection film formed on the surface. The water-soluble surface-protection film is made of hydroxy acid or salt thereof. The hydroxy acid or the salt thereof is one or more kinds selected from the group consisting of citric acid, tartaric acid, malic acid, gluconic acid and salts thereof. An example of the glass body is a funnel part having an anode button for a CRT.

8 Claims, 1 Drawing Sheet

GLASS ARTICLE HAVING SURFACE COATING OF HYDROXY ACID AND METHOD OF MANUFACTURING THE SAME

BACKGROUND OF THE INVENTION

1. Field of the Invention

The present invention relates to a glass article having a surface-protection coating and method for producing the glass article with the surface-protection coating, and in particular, to material of the surface-protection coating which can be easily washed off.

2. Description of the Related Art

During storage and handling operation of glass articles such as plate glass, bottle glass, tube glass and glass for electronic parts, those glass articles come often into contact with other glasses or another member and thereby suffer from surface scratches, and/or often contaminated by dust, dirt, moisture, or others which will be collectively called "dirt". The scratches or dirt are likely to cause product defects.

Even an invisible miniscule amount of contamination is not permitted, particularly for glass requiring high surface quality such as glass for cathode-ray tubes and glass substrates for flat panel displays, and glass for displays to which various types of surface treatments are performed in a following process. Due to the deposit of organic contaminants or the like in a small quantity, a finishing agent coated on a glass article in a later process cannot be wetted well but is repelled on the glass surface, thereby deteriorating film characteristics of the finishing agent.

As an example of those glass articles, there is known a cathode-ray tube (CRT). Referring to FIG. 1, the CRT comprises a panel glass 10, which has a generally rectangular face part 10a forming an effective screen and a skirt part 10b, a funnel-form funnel glass 11 attached to this panel glass 10 by sealing with frit glass (not shown in the figure), and a tube-form neck glass 13 joined to the funnel glass 11 and having an electron gun 12 attached therein. Electron beams from the electron gun 12 make a fluorescent film 14 on an inner surface of the panel glass 10 emit light to project images on the face 10a of the panel glass 10. Additionally, a metallic anode button 15 is attached as an anode terminal at a predetermined location on the funnel glass 11, and a reinforcing band 16 is mounted around the skirt part 10b of the panel glass 10 so as to maintain strength and to prevent scattering at the time of breakage. There are provided an aluminum film 17 so as to prevent the return of fluorescence from the fluorescent film 14, a shadow mask 18 so as to regulate the irradiation location of electron beams, stud pins 19 so as to fix the shadow mask 18, and a carbon film 20 so as to prevent high charge by electron beams of the shadow mask 18 and to be electrically continued and grounded outside.

The carbon film 20 is on inner and outer surfaces of the funnel glass 11 formed by applying carbon slurry, called dag thereon. However, when an invisible miniscule amount of organic contaminant is deposited on glass surfaces in storing or handling the funnel glass 11 before the application of carbon slurry, hydrophilic groups on the glass surfaces decrease. As a result, carbon slurry is likely to be repelled, and thus a uniform carbon film 20 cannot be easily formed.

Moreover, although a metallic oxide film is formed on the surface of the anode button 15, this film is likely to be contaminated with organic substances or the like because the film has higher surface free energy than the surrounding glass part. When organic contaminants deposit on the surface of the anode button 15, an adhesive property between the carbon film 20 and the anode button 15 becomes weak in applying carbon slurry and the carbon film 20 is likely to be easily peeled off. If the carbon film 20 on the surface of the anode button 15 peels off, functions would deteriorate for funnel glass for cathode-ray tubes, which thus causes serious problems.

Therefore, funnel glass for cathode-ray tubes is pre-washed with corrosive acid such as sulfuric acid, nitric acid and hydrofluoric acid, and strongly alkaline sodium hydroxide or the like to completely remove contaminants such as organic substances deposited on the surface of glass and an anode button, before coating carbon slurry to form a carbon film on inner and outer surfaces of the funnel glass.

However, since the liquid is highly harmful and dangerous, such a cleaning method requires meticulous care in handling cleaning liquid and is highly troublesome in treating the waste liquid, and also costly.

Particularly when contaminants adsorb on the surface of an anode button, the adsorption force of the contaminants is very strong. Therefore, complete removal of the contaminants must be made by polishing with an abrasive material, heating at high temperature of 400 to 500° C. for thermal decomposition, or washing over a long period with acid or alkali as mentioned above.

On the other hand, in the production of bottle glass or the like, there has been used a method where sulfurous acid gas or the like is blown onto a surface of hot glass products to thereby deposit onto the surface bloom as a reaction product with sodium in glass, by which glass surface scratches and cullet adhesion can be prevented.

This bloom is water-soluble and easily removable with water. However, this method has problems in that sulfurous acid gas corrodes peripheral devices. The reaction product is unlikely to deposit when there is a small amount of alkali in glass. It is also difficult to precisely control the amount and deposit conditions of the product.

Accordingly, in order to solve the above-noted problems, Japanese Unexamined Patent Publication (JP-A) No. H06-340865 proposes the coating of a surface-protection film made of water-soluble salts on the surface of a glass article. When the surface-protection film is washed out from the glass article, the contaminants deposited thereon can also be removed together with the surface-protection film. The surface-protection film is made of sodium tripolyphosphate, sodium sesquicarbonate and sodium tetraborate as examples disclosed therein. However, they are alkali materials, so that when a glass article is stored for a long period after coating the material on the glass article surface to form a surface-protection film, an alkali component in the surface-protection film gradually corrodes a glass surface, thus damaging the appearance of the article.

Moreover, such a surface-protection film of water-soluble salts is physically formed through precipitation of crystals on the glass surface and is therefore formed like small islands on the sea. Thus, when the film is reduced in its thickness, it is difficult to uniformly coat the film over the glass surface. Accordingly, the glass surface may often be contaminated because the glass surface would come into direct contact with a packaging material, sebum or the like during storage in a packaging box over a long period, thus contaminants adhering onto the glass surface.

Particularly, sodium tripolyphosphate and sodium tetraborate contain phosphorus and boron and therefore may damage living things and the environment. Therefore, a treatment facility is also required for treating waste liquid of them.

SUMMARY OF THE INVENTION

It is an object of the present invention to provide a glass article having a uniform and dense water-soluble surface-protection film applied on its glass surface for effectively protecting the glass surface from scratches, contamination, and corrosion even over a long period of storage. The surface-protection film may be easily washed off with water, and the waste liquid is quite safe for living things and the environment.

Further, it is another object of the present invention to provide a method for producing the glass article, as well as a method for cleaning the glass article.

A glass article of the present invention comprises a glass body having a glass surface and a water-soluble surface-protection coating applied onto a predetermined area of the glass surface, the water-soluble surface protection coating is made of a material comprising hydroxy acid or salt thereof.

A method of manufacturing a glass article of the present invention comprises: preparing a glass body having a glass surface for the glass article; preparing an aqueous solution of hydroxy acid or salt thereof; applying the aqueous solution onto a predetermined area of the glass surface to form a thin film of the aqueous solution on the predetermined area of the glass surface; and drying said thin film of the aqueous solution to form a dried film of the hydroxy acid or salt thereof.

A method of cleaning an article surface according to the present invention comprises: applying and drying an aqueous solution containing hydroxy acid or salt thereof to the article surface to form a water-soluble surface-protection film made of a material comprising hydroxy acid or salt thereof, and washing off the water-soluble surface-protection film together with contaminants deposited on the surface-protection film.

DESCRIPTION OF THE PREFERRED EMBODIMENTS

Figure 1:
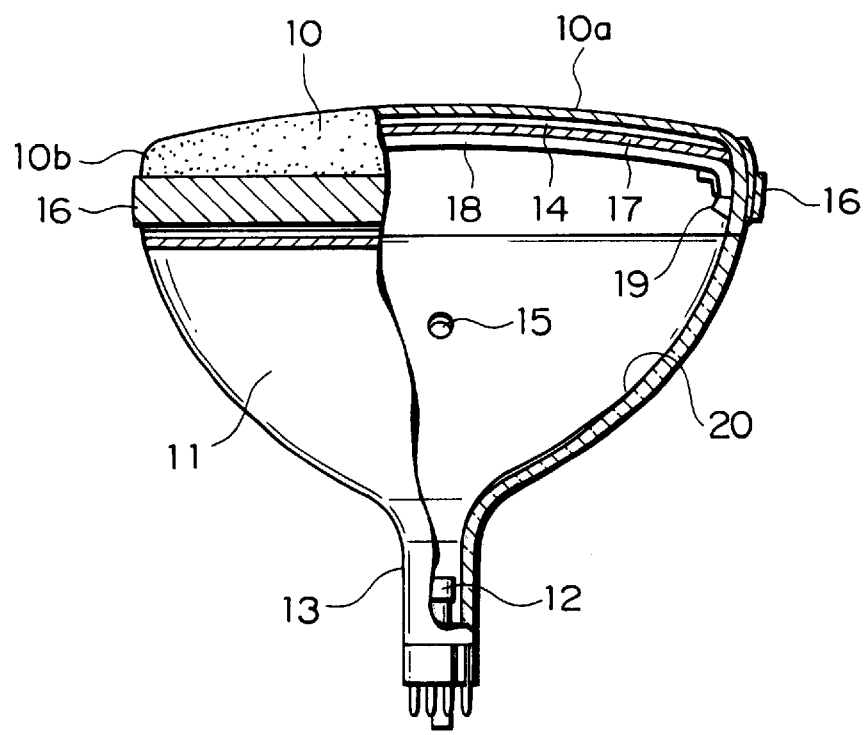
FIG. 1 is a partially sectional side view of a known cathode-ray tube as an example of a glass article.
Figure 2:
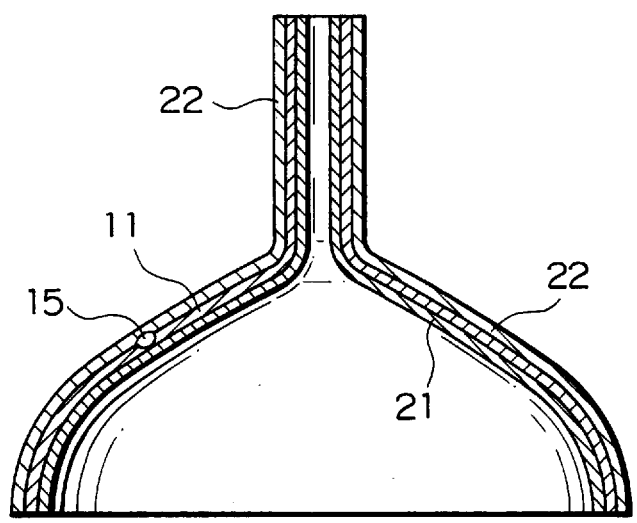
FIG. 2 is a sectional view of a glass funnel part according to an embodiment of the present invention.

Referring to FIG. 2, there is shown, as an embodiment of the present invention, a glass funnel 11 having an anode button 15 used for a CRT. The funnel has an inner surface-protection film 21 and an outer surface-protection film 22. The surface protection films 21 and 22 are of hydroxy acid or salt thereof. The inner and outer surface-protection films 21 and 22 are very thin layers relatively to the thickness of a glass wall of the funnel 11, for example 0.01 $\mu$m but is shown with a thickness similar to that of the glass wall only for purpose of convenience of drawing. In manufacturing the CRT, the surface-protection films 21 and 22 are washed out by water and a carbon layer (20 in FIG. 1) is deposited on the inner surface of the glass funnel 11, before assembling into the CRT.

The hydroxy acid used in the present invention is an organic material which has both carboxyl groups and hydroxyl groups as polar functional groups in one molecule. Since the hydroxy acid or salt thereof has two or more groups of those polar functional groups in one molecule, the hydroxy acid or salt thereof has an extremely high water-soluble property. Therefore, the surface-protection film of hydroxy acid or salt thereof formed on a glass surface is easily washed out by water in a short period.

When the film of hydroxy acid or salt thereof is formed onto a glass surface, polar groups in the hydroxy acid or the salt thereof are bonded, by the hydrogen bond, to hydroxyl groups, which are directly formed on the glass surface or which are formed by water adsorbed onto the glass surface. As a result, the film is obtained with a relatively high stability and by uniform and dense chemical adsorption to the hydrophilic glass surface, and the film is high in the film strength. Since each molecule includes carboxyl group or carboxylate group and hydroxyl group, its film is stabilized with the intermolecular hydrogen bond so that the film is a chemically highly stable hydrophilic coating. Furthermore, since any of those materials for the film is weakly acidic or neutral, the glass surface is unlikely to corrode even after the glass is in contact with the film over a long period.

However, common organic acids and salts thereof, such as stearic acid and sodium acetate, which are solid at room temperature, contain only one polar functional group providing a water soluble property. Therefore, even if a surface-protection film is formed on a glass surface by using these materials, the resultant surface-protection film is not uniform so that it has a problem to be insufficient for the prevention of contamination. Further, the surface-protection film cannot be easily washed off with water since the water-soluble property is relatively low. Furthermore, most of these common organic acids and salts thereof are less biodegradable than the hydroxy acid and salts thereof used in the present invention. The waste liquid after washing the film may thus be harmful for the environment.

In case of glass parts for cathode-ray tubes or glass substrates for flat display panels requiring high surface quality, it is required to prevent contamination even by volatile organic materials from cardboard boxes, packaging paper or the like for packaging those parts, and sebum.

The surface-protection film of the present invention is a uniform and dense film with no defects, and it can prevent organic substances or sebum from directly contacting a glass article even if the organic substances or sebum are deposited on the film surface. Specifically, this surface-protection film prevents contamination of a glass surface caused by external factors. The glass surface is also unlikely to be scratched even when the glass article is in contact with other glass articles or another member.

Additionally, the surface-protection film of the present invention is extremely water-soluble. Therefore, the surface-protection film can easily be washed out together with contaminants from the glass article such as funnel or panel for CRT prior to a surface treatment of the funnel or the panel such as the application process of dag to the funnel or the application of a fluorescent film to the panel. This makes it unnecessary to wash the funnel or the panel with hydrofluoric acid and/or its compounds, strong alkali or the like prior to the surface treatment.

Furthermore, considering that most of hydroxy acid and salts thereof are contained as metabolites in living things and also used for the food industry and the like, the surface-protection film of the present invention and the waste liquid after washing the film are extremely safe for living things and the environment.

Hydroxy acids which are solid at room temperature can preferably be used in the present invention. Preferable hydroxy acids are citric acid, tartaric acid, malic acid, DL-tropic acid, glyceric acid, aldonic acids such as gluconic acid, mannonic acid and galactonic acid, and aldaric acids such as saccharic acid and mannaric acid, and the like.

The salts of hydroxy acids for use in the present invention can also preferably be ones which are solid at room temperature. The preferable salts of hydroxy acids are salts such as sodium salts, potassium salts, ammonium salts and calcium salts of lactic acid, citric acid, tartaric acid, malic acid, DL-tropic acid, glyceric acid, aldonic acids such as gluconic acid, mannonic acid and galactonic acid, and aldaric acids such as saccharic acid and mannaric acid, and the like.

Among the above-noted hydroxy acids and salts, more preferable ones are ones selected from the group consisting of citric acid, tartaric acid, malic acid and gluconic acid and salts thereof (sodium or potassium salt), since they are highly biodegradable, economical and easily available.

In use of the surface-protection film of the present invention for the funnel part having anode button of CRT, it is preferable to use the salt of hydroxy acids for the surface-protection film. The reasons are as follows. In forming the surface-protection film of the present invention on funnel glass for a cathode-ray tube, the film also has to be applied on the surface of the anode button. A film made of hydroxy acid may corrode metal because of moisture in the film. However, another film made of the salt of hydroxy acids does not cause metal corrosion and is effectively bonded to the surface of the anode button by coordinate bonding. The film of the salt is uniformly formed, and cannot peel off easily. Accordingly, the surface of the anode button, which has a surface energy far higher than the glass surface and is easily contaminated, can be maintained clean over a long period.

In the present invention, a concentration of the hydroxy acid or the salt in an aqueous solution is preferably 0.01 to 5 wt. % in component concentration. This is because dust-proof function sharply lowers when the component concentration is less than 0.01 wt. %. On the other hand, when the component concentration is more than 5 wt. %, a large quantity of water is required to remove a resultant surface-protection film. More over, the resultant film is slippery so that it is difficult to handle a glass article having the film formed on the surface thereof.

The surface-protection film of the present invention can be formed onto a glass article by a conventional method such as a spraying method, a dipping method, a brushing method and a roller coating method.

The cleaning method of the present invention can also be applied to various types of articles made of inorganic materials such as glass, ceramics and metals. However, in removing the surface-protection film applied on an article of, particularly, glass, a removing method is appropriate by which no scratch is formed on the surface of the glass article by water pressure. More specifically, methods are adopted in which an article itself is dipped in a water bath or a surface-protection film is washed off with running water. Accordingly, even if contaminants were deposited on the surface-protection film, the contaminants would be removed from the glass article along with dissolving and washing off the surface-protection film by water. Especially when warm water at 30° C. or higher is used, the surface-protection film may be removed more easily, which is thus preferable.

Moreover, when the surface-protection film of the present invention is too thin, the film is likely to have defects. Thus, when a glass article is rubbed with another member or other glass articles, the glass article is likely to be scratched or to have direct contact with contaminants. On the other hand, when the film is too thick, it is too time-consuming to remove the surface-protection film and the material cost becomes high, which is thus not preferable. Therefore, the coating mass of the surface-protection film is preferably 0.0002 to 100 $\mu g/cm^2$, and the thickness thereof is preferably 0.001 to 1000 nm, more preferably 0.01 to 500 nm.

The surface-protection film of the present invention may be formed onto not the entire surface of a glass article but only a limited area on a surface of an article where neither scratch nor deposit of contaminants is desired.

The present invention will be explained in detail based on examples and comparative examples.

EXAMPLE 1

First, a funnel glass for a cathode-ray tube was cut into a 50 mm×50 mm plate form (8 mm in thickness). The plate was cleaned by washing the surface with running water for 10 seconds after being washed with 1% HF, and was subsequently dried by a drier.

Subsequently, after a 0.2% aqueous solution of tartaric acid was dropped on one surface of this glass plate to uniformly wet the surface, the surface was dried by a drier, thus forming a surface-protection film made of tartaric acid (10 nm in thickness) on the surface of the glass plate.

EXAMPLE 2

In the similar manner in Example 1, a glass plate was prepared and washed, and the surface was dried after being cleaned. After a 0.2% aqueous solution of potassium tartrate was dropped on one surface thereof to uniformly wet the surface, the surface was dried by a drier, thus forming a surface-protection film made of potassium tartrate (10 nm in thickness) on the surface of the glass plate.

EXAMPLE 3

In the similar manner in Example 1, a glass plate was prepared and washed, and the surface was dried after being cleaned. After a 0.2% aqueous solution of citric acid was dropped on one surface thereof to uniformly wet the surface, the surface was dried by a drier, thus forming a surface-protection film made of citric acid (10 nm in thickness) on the surface of the glass plate.

EXAMPLE 4

In the similar manner in Example 1, a glass plate prepared and was washed, and the surface was dried after being cleaned. After a 0.2% aqueous solution of tri-sodium citrate was dropped on one surface thereof to uniformly wet the surface, the surface was dried by a drier, thus forming a surface-protection film made of tri-sodium citrate (10 nm in thickness) on the surface of the glass plate.

EXAMPLE 5

In the similar manner in Example 1, a glass plate was prepared and washed, and the surface was dried after being cleaned. After a 0.2% aqueous solution of malic acid was dropped on one surface thereof to uniformly wet the surface, the surface was dried by a drier, thus forming a surface-protection film made of malic acid (10 in thickness) on the surface of the glass plate.

EXAMPLE 6

In the similar manner in Example 1, a glass plate was prepared and washed, and the surface was dried after being cleaned. After a 0.2% aqueous solution of di-sodium malate was dropped on one surface thereof to uniformly wet the surface, the surface was dried by a drier, thus forming a surface-protection film made of di-sodium malate (10 in thickness) on the surface of the glass plate.

EXAMPLE 7

In the similar manner in Example 1, a glass plate was prepared and washed, and the surface was dried after being cleaned. After a 0.2% aqueous solution of gluconic acid was dropped on one surface thereof to uniformly wet the surface, the surface was dried by a drier, thus forming a surface-protection film made of gluconic acid (10 in thickness) on the surface of the glass plate.

EXAMPLE 8

In the similar manner in Example 1, a glass plate was prepared and washed, and the surface was dried after being cleaned. After a 0.2% aqueous solution of sodium gluconate was dropped on one surface thereof to uniformly wet the surface, the surface was dried by a drier, thus forming a surface-protection film made of sodium gluconate (10 in thickness) on the surface of the glass plate.

COMPARATIVE EXAMPLE 1

In the similar manner in Example 1, a glass plate was prepared and washed as in Example 1, and the surface was dried after being cleaned. After a 0.2% aqueous solution of sodium tetraborate was dropped on one surface thereof to uniformly wet the surface, the surface was dried by a drier, thus forming a surface-protection film made of sodium tetraborate (10 in thickness) on the surface of the glass plate.

COMPARATIVE EXAMPLE 2

In the similar manner in Example 1, a glass plate was prepared and washed, and the surface was dried after being cleaned. After a 0.2% aqueous solution of sodium acetate was dropped on one surface thereof to uniformly wet the surface, the surface was dried by a drier, thus forming a surface-protection film made of sodium acetate (10 in thickness) on the surface of the glass plate.

Dust-proof tests against cardboard box contamination were performed on each glass plate of Examples 1 to 8 and Comparative Examples 1 and 2. For comparison, the similar test was carried out on a glass plate with no coating of a surface-protection film that was only washed and dried.

This dust-proof test was carried out as follows. First, cardboard of φ 80 mm was laid inside a glass laboratory dish of φ 90 mm. After each of sample glass plates was placed thereon with its surface-protection film being faced downward, it was kept at 80° C. in atmospheric temperature under 100% of humidity for 20 hours. Subsequently, the glass plate was taken out of the dish and dipped in a bath of deionized water at 40° C. for 30 seconds to remove the film, and then it was dried by a drier. Then, water was dropped on the surface of the sample glass plate from which the surface-protection film was removed, and a contact angle with water was measured by a contact angle meter (FACE CA-D manufactured by KYOWA INTERFACE SCIENCE CO., LTD.). The results are shown in Table 1. Dust-proof is estimated higher as the contact angle with water is smaller.

Additionally, pH measurement was performed on each aqueous solution used in Examples 1 to 8 and Comparative Examples 1 and 2, and the pH values measured are shown in Table 1.

TABLE 1

|  | Contact Angle with Water | pH |
| --- | --- | --- |
| Example 1 | 13° | 2.5 |
| Example 2 | 6° | 5.5 |
| Example 3 | 10° | 2.5 |
| Example 4 | 5° | 7.0 |
| Example 5 | 12° | 2.5 |
| Example 6 | 6° | 6.5 |
| Example 7 | 4° | 2.5 |
| Example 8 | 5° | 6.0 |
| Comparative Example 1 | 28° | 10.0 |
| Comparative Example 2 | 32° | 8.0 |
| No coating | 40° | — |

According to Table 1, the sample glass plates of Examples 1 to 8 have much smaller contact angles with water than the sample glass plates of Comparative Examples 1 and 2 and the sample glass plate with no coating, after dust-proof test. Thus, the sample glass plates of the examples 1 to 8 have a small degree of contamination and high dust-proof properties, and glass surfaces thereof may be kept clean over a long period.

Moreover, the glass plates of Examples 1 to 8 were dipped in a bath of deionized water at 40° C. for 30 seconds to remove surface-protection films and then dried by a drier. Subsequently, the glass surfaces were observed by a microscope, and no residue was observed.

EXAMPLE 9

A funnel glass for a cathode-ray tube (manufactured by Nippon Electric Glass Co., Ltd., 17 inches) was cut into a 40 mm×40 mm plate form (8 mm in thickness) where an anode button was included. The plate was cleaned by washing the surface with running water for 10 seconds after being washed with 1% HF and was then dried by a drier.

Subsequently, a 0.2% aqueous solution of tartaric acid was dropped on one surface of this glass plate including the anode button to uniformly wet the surface, and then the surface was dried by a drier to thereby form a surface-protection film made of tartaric acid (10 in thickness).

EXAMPLE 10

In the similar manner in Example 9, a glass plate having the anode button was prepared, washed and then dried. A 0.2% aqueous solution of sodium tartrate was dropped on one surface thereof to uniformly wet the surface. The surface was dried by a drier to thereby form a surface-protection film made of sodium tartrate (10 in thickness).

EXAMPLE 11

In the similar manner in Example 9, a glass plate having the anode button was prepared, washed and then dried. A 0.2% aqueous solution of malic acid was dropped on one surface thereof to uniformly wet the surface. The surface was dried by a drier to thereby form a surface-protection film made of malic acid (10 in thickness).

EXAMPLE 12

In the similar manner in Example 9, a glass plate having the anode button was prepared, washed and then dried. A 0.2% aqueous solution of di-sodium malate was dropped on one surface thereof to uniformly wet the surface. Then, the surface was dried by a drier to thereby form a surface-protection film made of di-sodium malate (10 in thickness).

COMPARATIVE EXAMPLE 3

In the similar manner in Example 9, a glass plate having the anode button was prepared, washed and then dried. A 0.2% aqueous solution of sodium tetraborate was dropped on one surface thereof to uniformly wet the surface. Then, the surface was dried by a drier to thereby form a surface-protection film made of sodium tetraborate (10 in thickness).

Dust-proof tests against cardboard box contamination were also performed on each of sample glass plates of Examples 9 to 12 and Comparative Example 3. For comparison, the similar test was carried out on a glass plate having the anode button but with no coating of a surface-protection film, that glass plate was only washed and dried.

This dust-proof test was carried out as follows. First, cardboard of φ 80 mm was laid inside a glass laboratory dish of φ 90 mm. After a glass plate was placed thereon with a surface-protection film faced downward, it was kept at 80° C. in atmospheric temperature under 100% of humidity for 40 hours. Subsequently, the glass plate was taken out of the dish and was dipped in a bath of deionized water at 40° C. for 30 seconds to remove the film, and then, it was dried by a drier. Then, carbon slurry was coated, by a sponge, onto the surface of the anode button of each sample glass plate, and was then dried to form a carbon film. Scotch tape (NITTO No. 31B) was applied onto the carbon film on the surface of the anode button, and was forcefully peeled out so as to confirm if the carbon film was peeled off. The results thereof are shown in Table 2. When the carbon film is not peeled off, it indicates high fixing force of the carbon film to the surface of the anode button and a high dust-proof property of a surface-protection film.

TABLE 2

| | Peeling of Surface-protection film |
|---|---|
| Example 9 | Not peeled off |
| Example 10 | Not peeled off |
| Example 11 | Not peeled off |
| Example 12 | Not peeled off |
| Comparative Example 3 | Partially peeled off |
| No Coating | Entirely peeled off |

Table 2 shows that the carbon films in Examples 9–12 were not peeled off from the surface of the anode button. It is noted from this that the glass plates of Examples 9 to 12 have superior dust-proof properties than the glass plates of Comparative Example 3 and the glass with no coating.

Moreover, the glass plates formed with surface-protection films of Examples 9 to 12 were dipped in a bath of deionized water at 40° C. for 30 seconds to remove the films and were then dried by a drier. The glass surfaces were observed by use of a microscope, and no residue of the film was observed from any of the glass plates.

Next, the surface-protection film on the surface of each of the glass plates of Examples 1 to 12 was rubbed once with a load of 40 gr by using a No. 1000 abrasive paper. Thereafter, the surface of the surface-protection film was observed by use of a microscope. The surface-protection film was partially defective, but no scratch was found out on the surface of the glass and the anode button.

Referring to FIG. 2, a funnel glass 11 for a cathode-ray tube having an anode button 15 attached thereto (manufactured by Nippon Electric Glass Co., Ltd., 17 inches) was washed entirely with 1% HF and then was washed and cleaned with running water, and then it was dried by a drier. Thereafter, the funnel glass 11 was dipped in a bath of the similar aqueous solution as in Example 6 to wet the inner and outer entire surfaces of the funnel glass evenly. Then, the funnel glass 11 was lifted from the bath and was dried by a drier. Thus, an inner and outer surface-protection film 21 and 22 di-sodium malate was formed on the inner and outer surfaces of the funnel glass 11. This funnel glass with the surface protection films was stored in a cardboard packaging box, and taken out therefrom after three months. The funnel glass was dipped in a bath of deionized water at 40° C. for 30 seconds to remove the surface-protection films 21 and 22, and it was dried by a drier after being taken out therefrom. Then, carbon slurry was coated on the inner and outer surface of the funnel glass 11 and then dried. Thus, a carbon film was well formed over the entire surface of the funnel glass including the anode button surface. Then, Scotch tape was applied onto the carbon film and was peeled. The carbon film did not peel off.

As described above, the glass article of the present invention is coated with a uniform and dense water-soluble surface-protection film of hydroxy acid or salt thereof, on its surface. Thus, the glass surface of the glass article can be effectively prevented from surface scratch and contamination, and is also hardly corroded even after a long period of storage. Moreover, the surface-protection film may be easily washed off with water, and the waste liquid after washing is extremely safe for living things and the environment.

Therefore, the glass article of the present invention is suitable for glass for cathode-ray tubes and glass substrates for flat display panels, which particularly require high surface quality or to which various types of surface treatments are performed. Moreover, by coating a surface-protection film on a functional film formed on a glass article such as a conductive film and a reflection reducing coating, defects and contamination of functional films can be avoided.

Furthermore, according to the method of manufacturing a glass article of the present invention, a uniform and dense water-soluble surface-protection film may be coated on the glass surface, so that surface scratch and contamination may be effectively prevented and the glass surface will hardly corrode even after a long period of storage.

Additionally, according to the method of cleaning an article of the present invention, a uniform and dense water-soluble surface-protection film may be coated on the article surface. Therefore, the surface is neither contaminated nor corroded even if the glass is stored over a long period. Even if contaminants were deposited, it can be washed off along with the surface-protection film, so that the article surface regains the cleanliness before the coating of the surface-protection film. Furthermore, the waste liquid after washing is extremely safe for organisms and the environment.

What is claimed is:

1. A funnel glass with an anode button for a cathode-ray tube, said funnel glass having a surface including the anode button surface and a water-soluble surface-protection film formed on a predetermined area of the surface, said water-soluble surface-protection film being made of a material comprising a salt of hydroxy acid.

2. The funnel glass according to claim 1, wherein the salt of hydroxy acid is one or more salts selected from the group consisting of a salt of citric acid, tartaric acid, malic acid, and gluconic acid.

3. A method of manufacturing a funnel glass with an anode button for a cathode-ray tube, comprising:

preparing a glass funnel body with an anode button having a surface including an anode button surface;

preparing an aqueous solution containing a salt of hydroxy acid;

applying the aqueous solution onto a predetermined area of the surface of the glass body to form a thin wet film of the aqueous solution on the predetermined area of the surface; and drying the thin wet film to form a water-soluble surface-protection film of a material comprising the salt of hydroxy acid on the surface of the glass funnel body.

4. The method according to claim 3, wherein the salt of hydroxy acid is one or more salts selected from the group consisting of a salt of citric acid, tartaric acid, malic acid, and gluconic acid.

5. The method according to claim 3, wherein the aqueous solution has a component concentration of the salt of hydroxy acid at 0.01 to 5 wt. %.

6. A method of cleaning a surface of a funnel glass with an anode button for a cathode-ray tube, comprising the steps of:

applying an aqueous solution containing a salt of hydroxy acid to the surface, thus forming a water soluble surface-protection film made of a material comprising the salt of hydroxy acid; and washing off contaminants deposited on a surface of the surface-protection film along with the surface-protection film.

7. The method according to claim 6, wherein the salt of hydroxy acid is one or more salts selected from the group consisting of citric acid, tartaric acid, malic acid, and gluconic acid.

8. The method according to claims 6, wherein the aqueous solution has a component concentration of the salt of hydroxy acid at 0.01 to 5 wt. %.

* * * * *